US007873993B2

(12) United States Patent
King

(10) Patent No.: US 7,873,993 B2
(45) Date of Patent: Jan. 18, 2011

(54) PROPAGATING BLACK HOLE SHUNTS TO REMOTE ROUTERS WITH SPLIT TUNNEL AND IPSEC DIRECT ENCAPSULATION

(75) Inventor: Joel W. King, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1308 days.

(21) Appl. No.: 11/270,206

(22) Filed: Nov. 9, 2005

(65) Prior Publication Data

US 2007/0104197 A1 May 10, 2007

(51) Int. Cl.
*G06F 9/00* (2006.01)
*G06F 15/16* (2006.01)
*G06F 17/00* (2006.01)
(52) U.S. Cl. .................... 726/11; 726/1; 726/6; 726/22
(58) Field of Classification Search ....................... 726/1, 726/6, 11, 15, 22, 25
See application file for complete search history.

(56) References Cited

U.S. PATENT DOCUMENTS

| | | | |
|---|---|---|---|
| 6,714,970 B1 * | 3/2004 | Fiveash et al. ............... | 709/219 |
| 6,876,655 B1 * | 4/2005 | Afek et al. ................... | 370/392 |
| 7,120,934 B2 * | 10/2006 | Ishikawa ..................... | 726/23 |
| 7,302,705 B1 * | 11/2007 | Boivie ......................... | 726/22 |
| 7,355,983 B2 * | 4/2008 | Scudder et al. ............. | 370/242 |
| 7,356,596 B2 * | 4/2008 | Ramanujan et al. ......... | 709/227 |
| 7,444,417 B2 * | 10/2008 | Jayawardena et al. ....... | 709/229 |
| 7,525,921 B1 * | 4/2009 | Yi Dar Lo .................... | 370/241 |
| 2001/0039623 A1 * | 11/2001 | Ishikawa ..................... | 713/201 |
| 2002/0066034 A1 * | 5/2002 | Schlossberg et al. ........ | 713/201 |
| 2002/0166063 A1 | 11/2002 | Lachman, III et al. | |
| 2003/0110288 A1 * | 6/2003 | Ramanujan et al. ......... | 709/238 |
| 2003/0233473 A1 * | 12/2003 | Bonhomme et al. ......... | 709/238 |
| 2005/0125692 A1 | 6/2005 | Cox et al. | |
| 2005/0177634 A1 * | 8/2005 | Scudder et al. ............. | 709/225 |
| 2005/0180416 A1 * | 8/2005 | Jayawardena et al. ....... | 370/389 |
| 2006/0031483 A1 * | 2/2006 | Lund et al. ................... | 709/224 |

(Continued)

OTHER PUBLICATIONS

Cisco, Phase 1—Prepare the Tools and Techniques, 2002, <http://boyan.ludost.net/security/ftp-eng.cisco.com/cons/isp/security/H_Preparation_Tools_v2-3.pdf>.*

(Continued)

*Primary Examiner*—David García Cervetti
(74) *Attorney, Agent, or Firm*—Fish & Richardson P.C.

(57) ABSTRACT

Remote routers are configured to block the return path to malicious websites with the use of split tunneling while allowing paths to third party resource websites. The iBGP protocol runs on the agent's router, advertises routes and enables the head-end to set up a policy at each remote router. Enterprise policies for blocking access to "blackholed" website addresses are centrally administered but third party website traffic is not routed to the enterprise's network resources. Since remote offices may connect directly to third party websites, latency is minimized and network resources at the enterprise are not unduly burdened.

22 Claims, 3 Drawing Sheets

U.S. PATENT DOCUMENTS

| | | |
|---|---|---|
| 2006/0031575 A1* | 2/2006 | Jayawardena et al. ....... 709/239 |
| 2006/0059238 A1* | 3/2006 | Slater et al. ................ 709/206 |
| 2006/0156402 A1* | 7/2006 | Stone et al. ................... 726/22 |
| 2006/0167871 A1* | 7/2006 | Sorenson et al. ............... 707/6 |
| 2006/0230444 A1* | 10/2006 | Iloglu et al. ................... 726/14 |
| 2006/0242694 A1* | 10/2006 | Gold et al. .................... 726/13 |
| 2006/0291446 A1* | 12/2006 | Caldwell et al. ............ 370/351 |
| 2007/0064690 A1* | 3/2007 | Karpagavinayagam ...... 370/389 |
| 2007/0079367 A1* | 4/2007 | Ishikawa ..................... 726/13 |
| 2007/0250644 A1* | 10/2007 | Lund et al. .................. 709/245 |
| 2008/0127338 A1* | 5/2008 | Cho et al. .................... 726/22 |
| 2008/0147843 A1* | 6/2008 | Scudder et al. ............. 709/223 |
| 2008/0270601 A1* | 10/2008 | Ishikawa .................... 709/224 |
| 2009/0031040 A1* | 1/2009 | Jayawardena et al. ....... 709/242 |

OTHER PUBLICATIONS

Brad Engstrom, Denial of Service Attacks, 2002, Cisco, <http://www.griffith.edu.au/conference/questnet2003/docs/Brad_Engstrom.pdf>.*

Brad Engstrom, "Denial of Service Attacks Using IP Routing as a Security Tool", Cisco Systems, Inc., Copyright © 2002, 40 pages.

Brian W. Gemberling, Christopher L. Morrow and Barry R. Greene, "ISP Security—Real World Techniques, Version 1.0", (www.nanog.org/mtg-0110/ppt/greene.ppt), 114 pages.

Addia, Ben, et al., "Lightweight Signatures for Email", Jun. 24, 2005 [online] [retirved No. Jun. 21, 2005] Retirved from Internet URL; http://people.csail.mit.edu/rivest/AdidaChauHohenbergerRivest-LightweightSigunaturesFor Email.pdf, 18 pages.

* cited by examiner

PROPAGATING BLACK HOLE SHUNTS TO REMOTE ROUTERS WITH SPLIT TUNNEL AND IPSEC DIRECT ENCAPSULATION

COPYRIGHT NOTICE

A portion of the disclosure recited in the specification contains material which is subject to copyright protection. Specifically, portions of source code instructions are included for processes by which embodiments of the invention practiced in a computer system. The copyright owner has no objection to the facsimile reproduction of the specification as filed in the Patent and Trademark Office. Otherwise all copyright rights are reserved.

BACKGROUND OF THE INVENTION

The present invention relates to a network system and more particularly to an apparatus and method for distributing a central policy to distributed egress points on an enterprise network.

Many companies, governmental agencies and other organizations (collectively "enterprises") are interested in having employees and others, such as consultants and business partners, work from remote locations rather than be physically present at a particular enterprise facility. Teleworking, the concept of using advanced communication technology to enable business to be conducted from locations remote from the enterprise's facility, is increasingly popular as high bandwidth internet access becomes widely available. Indeed, as the cost of maintaining office space, travel and fuel escalate, enterprises find that teleworking generates substantial savings and is widely popular with employees and business contacts (collectively 'agents').

Teleworking is wholly dependant on the ability to enable access to an enterprise's proprietary network for voice, data and multimedia applications from remote locations. With the increased availability of high speed Internet and voice over Internet protocol (VOIP) technology, agents can both access the enterprise's computer systems and communication network as if they were working from the enterprise's office. A remote office, such as at an agent's home, provides great benefit for both the enterprise and the agent because the enterprise saves the money it would normally spend on leasing office space and the agent saves the time normally spent commuting.

Many enterprises supply VOIP technology that can be used by the agent. For example, Cisco Systems, Inc. of San Jose, Calif., the assignee of the present application, currently markets voice and video enabled VPN (V3PN) solutions that integrate cost-effective, secure connectivity provided by site-to-site IPSec VPNs for delivering converged voice, video, and data IP networks. V3PN is typically a site-to-site deployment using T1 lines and the Internet so voice quality is similar to that of a toll call. When design guidelines for IPSec over ADSL are followed, a caller cannot hear a difference in voice quality when the IP telephone is connected from the employee home over a broadband connection. IPSec refers to an IP security protocol developed by the Internet Engineering Task Force (IETF), the main standards organization for the Internet, to support secure exchange of packets at the IP layer. IPSec has been deployed widely to implement Virtual Private Networks (VPNs). ADSL refers to Asymmetric Digital Subscriber Lines that are used to deliver high-rate digital data over existing ordinary phone-lines. ADSL facilitates the simultaneous use of normal telephone services and high speed data transmission rates of about 1.5 to 9 megabits per second (Mbps) when receiving data (known as the downstream rate) and from 16 to 640 kilobits per second (Kbps) when sending data (known as the upstream rate).

Typically, enterprise IPSec deployments rely on non-split tunnel configurations to force agent Internet access through the enterprise's campus head-end. In this configuration, enterprise policies for blocking access to selected web site addresses are centrally administered. One common technique for blocking access is popularly referred to as a black hole shunt. A "black hole shunt" forwards malicious packet traffic to a router's bit bucket or a null route rather than forwarding it on to the designated destination.

This configuration, however, introduces additional latency for accessing Internet sites for the agent's router as all the traffic from each agent is routed to the head-end. Additional loading on the head-end and Internet WAN links occurs because most enterprises also encrypt the traffic between the enterprise and the agent's router and this encrypted traffic must be handled even if the public web site is the ultimate destination. To illustrate, in a typical network system, a portion of the packet traffic is destined for the enterprise and the remaining portion is to be forwarded on to an Internet server. The requirement to force all packets via the IPSec tunnel to the head-end results in the inefficient utilization of the IPSec tunnel bandwidth simply to apply a central policy.

Other problems arise with this configuration when fake e-mails, commonly referred to as "phishing" e-mails, from fraudulent aliases are delivered to agents and internal e-mail aliases. When phishing e-mails are discovered, an enterprise typically must add the destination of the phishing information to a list of "blackholed" or prohibited addresses to keep agents from accessing the site. In addition, the enterprise and the ISP responsible for the destination IP have to cooperate to make sure that the rogue website is taken offline. A rogue website refers to a website on a host server that is programmed to achieve a mischievous or malicious end result.

What is needed is a configuration that can dynamically propagate the list of "blackholed" website addresses in a split tunnel configuration from the enterprise head-end to each remote agent router. What is also needed is a system and a method that can efficiently distribute a central policy to distributed egress points from the enterprise network rather than moving agent packet traffic to the head-end before egress to the Internet.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention.

One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. In accordance with various embodiments for the present invention, the iBGP protocol configures remote office routers to block the return path to malicious websites with the use of split tunneling while allowing paths to third party resource websites. The iBGP protocol runs on the remote router, advertises routes from the enterprise iBGP router to the remote router and enables the head-end to effectively set up a policy at each remote router. Enterprise policies for blocking access to "blackholed" rogue website addresses are centrally administered but third party website traffic is not routed to the enterprise's network resources. Since remote offices may connect directly to third party websites, latency is minimized and network resources are not unduly burdened.

BGP refers to the border gateway protocol, which is one of the core routing protocols in the Internet. This protocol works by maintaining a table of IP networks or 'prefixes' that designates network reachability between autonomous systems (AS) and described a path to the AS. When a BGP speaking router with no local policy configured receives multiple network layer reachability information from the internal BGP (iBGP) for the same destination, the router will choose one iBGP path as the best path based on a set of rules. The best path is then installed in the IP routing table of the router. A BGP session between two BGP peers is said to be an internal BGP (iBGP) session if the peers are in the same Autonomous System, or have the same AS number. In accordance with the present invention, each remote router and the enterprise BGP router preferably have the same AS number. Note that the enterprise BGP router may also have external peers to one or more ISPs. Note further that the enterprise BGP router may have both internal and external peers, only external peers, or only internal peers depending on the AS numbers associated with the peer statement in the router configuration.

Figure 1:
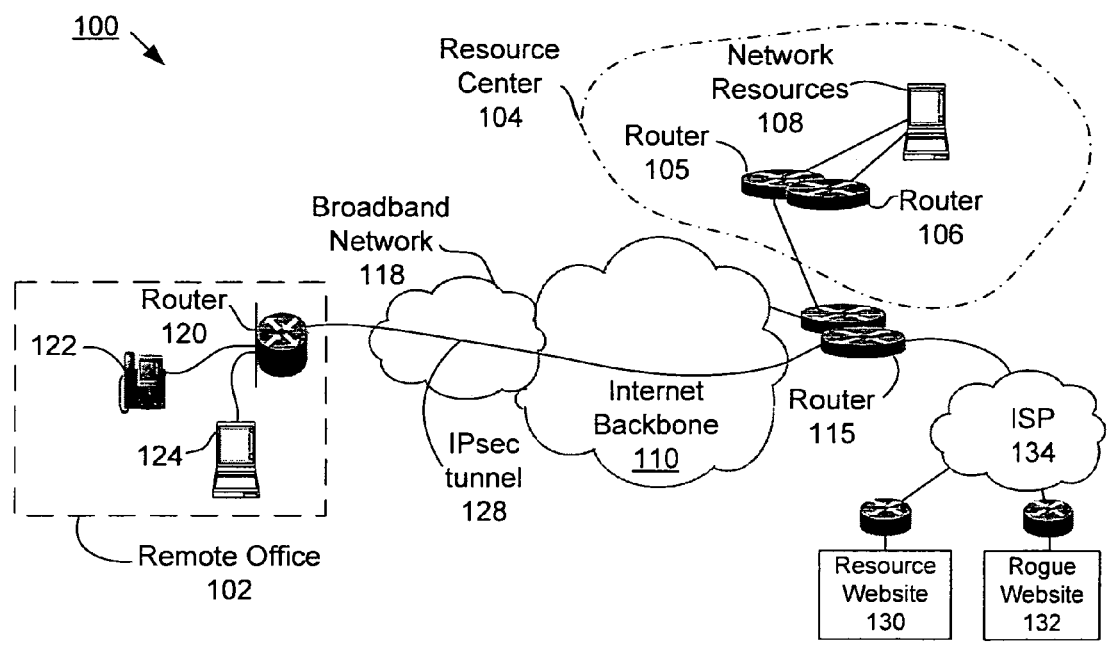
FIG. 1 is a simplified block diagram illustrating one exemplary representative network topology where a remote router operates to identify and blackhole packet traffic destined to a rogue website in accordance with an embodiment of the present invention.

Referring now to the drawings more particularly by reference numbers, a simplified embodiment of a representative communication network environment 100 for supporting at least one remote agent is shown in FIG. 1. It is to be understood that the actual configuration of network environment 100 will likely vary depending on the specific capabilities required for a given application. As such, the network configuration illustrated in FIG. 1 is exemplary in nature.

Enterprise IPSec deployments typically deploy non-split tunnel configurations to force all teleworker Internet access through the head-end of center 104. In this configuration, corporate policies for blocking access to "blackholed" website addresses are centrally administered. A technique for blocking access is termed a black hole shunt. This configuration, however, introduces additional latency for accessing Internet sites for the remote agent and additional load on the campus crypto head-ends and Internet WAN links. Accordingly, the present invention provides a configuration that dynamically propagates from the campus head-end to each teleworker router the list of "blackholed" website addresses in a split tunnel configuration. This black hole list is a database that keeps track of systems or web site addresses from which spam originates. The present invention effectively pushes the central policy to distributed egress points from the enterprise network rather than moving the packet of the teleworker to the central policy before egress to the Internet WAN links.

In FIG. 1, a remote office 102 connects with an enterprise network resource center 104. Center 104 functions as the main route point for packet traffic between office 102 and enterprise's data and communication networks. Center 104 typically includes network resources 108, which may include application or data servers, voice over IP (VoIP) call manager servers, multimedia servers, encryption servers, firewalls, load balancers and the like. Center 104, which may be considered an autonomous system, is connected to the Internet by edge routers 105 and 106. Routers 105 and 106 couple network resources 108 to the Internet backbone 110. Intermediate routers or switches, such as WAN router 115, may be selected depending on the selected route path to remote office 102.

Internet backbone 110 transports packet traffic from center 104 to one of a plurality of broadband networks, such as broadband network 118. Broadband network 118 is operated by a broadband service provider and is typically a wide area network (WAN) that serves a local market.

Remote office 102 is connected to broadband network 118 by a router 120. It is to be understood that although only a single remote office is illustrated in FIG. 1, a plurality of such remote offices may be connected to broadband network 118 and each remote office will include its own router. Each router 120 can couple a plurality of IP devices such as an IP telephone 122 and computer 124 to the broadband network 118. Either or both of telephone 122 and computer 124 may be connected to router 120 by wire or by a wireless connection. Agents often require access to enterprise information such as enterprise data vaults, product information, email, voice or multi-media services and other such resources provided by network resources 108. The challenge facing the enterprise is how to provide these resources without unduly increasing the time it takes to access third party resources such as resource website 130.

In operation, traffic between center 104 and remote office 102 is encrypted with IPSec over a tunnel 128 thereby providing a secure network connection. The IPSec tunnel is an open standard that provides secure transmission of sensitive information over unprotected networks such as the Internet. IPSec acts at the network layer, protecting and authenticating IP packets between participating IPSec devices or peers, such as routers 106 and 120. In general, peers refer to neighboring IPSec devices but note that peers are not required to be directly connected if there is IP connectivity between them. BGP is used to unicast TCP sessions between peers, and can be transported within IPSec only (direct) with no need for a tunneling protocol to carry the IP multicast packets. In other embodiments, a GRE tunnel may be implemented such that the enterprise could advertise routes via the GRE tunnel by way of a multicast protocol such as IGP, like EIGRP or OSPF but this embodiment would require a tunneling protocol to carry the IP multicast packets that an IGP requires.

With communication network environment 100, agents can work over the IPSec tunnel 128 to implement a agent deployment so that network resources are readily and securely accessed. However, when a teleworker needs to access information at a third party's website, such as website 130, it is not desirable to route all the traffic through center 104 because of the potential to exceed traffic level capacities that can be handled by center 104. If a network administrator, responsible for implementing and monitoring security in network environment 100, has implemented centrally administered corporate policies for blocking access to "blackholed" Website addresses, such as rogue website 132, there is little ability to individually set up and monitor each remote office. Thus, in a deployment consisting of several hundred or several thousands of agents at a like number of remote offices, the present invention pushes a centralized policy to each remote office. This decentralize security response is effective in responding to either phishing attacks or attacks from rogue website 132 or other rogue hosts. With the present invention, the decentralized security responses enables traffic from a rogue host to reach a teleworker but effectively blocks return traffic without requiring all traffic to be routed through center 104.

In accordance with an embodiment of the present invention, a configuration is dynamically propagated from center 104 head-end to each remote office router 120 with the list of "blackholed" website addresses in a split tunnel configuration. The dynamically propagated configuration effectively pushes a central policy from the enterprise head end to distributed egress points. By propagating the configuration to each remote office, there is no need to route packet traffic from the remote office to center 104.

Each router 120 deploys iBGP to receive host routes that identify the rogue websites or servers. These host routes are centrally configured as the IP address of a rogue server is identified. IBGP prevents access from the remote office by sending the website address to a blackhole. It is important to note that iBGP does not advertise routes between the remote office 102 and the head-end center 104 because the IPSec VPN uses direct IPSec encapsulation. Accordingly, the advertisement of the agent's subnet is handled as a function of the IPSec protocol. The IPSec peer at the enterprise. is aware of the subnet that exists at the remote office as this information is exchanged if there is an active IKE/IPSec tunnel.

Addresses for rogue websites are blackholed by configuring the next-hop to, by way of example, 192.0.2.1 and then pushing that down to the remote router 120. It is to be understood that any other network address that is not used on the Internet or in an enterprise for an actual host address may be adopted as the blackhole. Traffic to these rogue websites flows down the default address to a bit-bucket. Latency and network loading is improved because return traffic is never sent out from router 120. Indeed it never makes it to the ISP because there is a route, ip route 192.0.2.0 255.255.255.0 Null0 name TEST_NET on every router 120 in the network that is just for documentation and is not otherwise a legitimate route. With this route to Null 0 on the remote routers 120 and a 'set ip next-hop 192.0.2.1' being advertised for the rogue host route via iBGP, computer 124 cannot contact the rogue website 132. Packet traffic to and from other websites can reach the computer 124 provided it is allowed by the local firewall. However, since packets destined for the rogue website 132 from computer 124 never get routed out the outside interface, the firewall will not accept packets from rogue website 132. Note that rogue-host bound traffic is not pulled to the enterprise center 104 for disposal but rather the packet traffic actually dies at the network edge.

Figure 2:
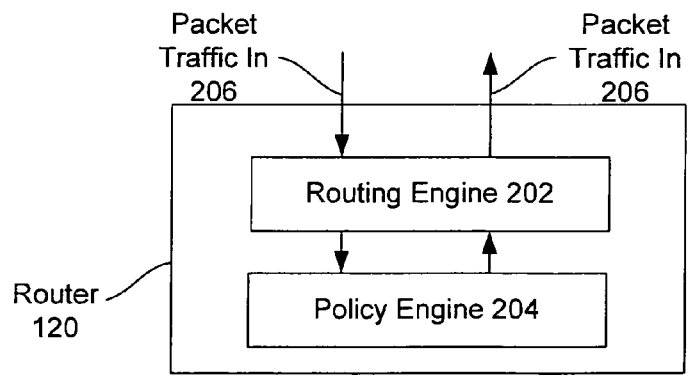
FIG. 2 illustrates an embodiment of a remote router in accordance with the present invention.

Refer now to FIG. 2 where another embodiment of the present invention is shown. Router 120 may be, by way of illustration, a commercially available router typically deployed at homes and small businesses such as the Cisco 830 series router. Router 120 includes a routing engine 202 that handles routing related tasks and a policy engine 204 that enforces routing policies. Policy engine 204 includes iBGP. Since iBGP is a TCP session between router 120 and its peers, it can operate within a unicast IPSec Tunnel. Advantageously, iBGP peer routers do not need to be directly connected and iBGP peer routers in a route reflector configuration do not need to be fully meshed.

Figure 3:
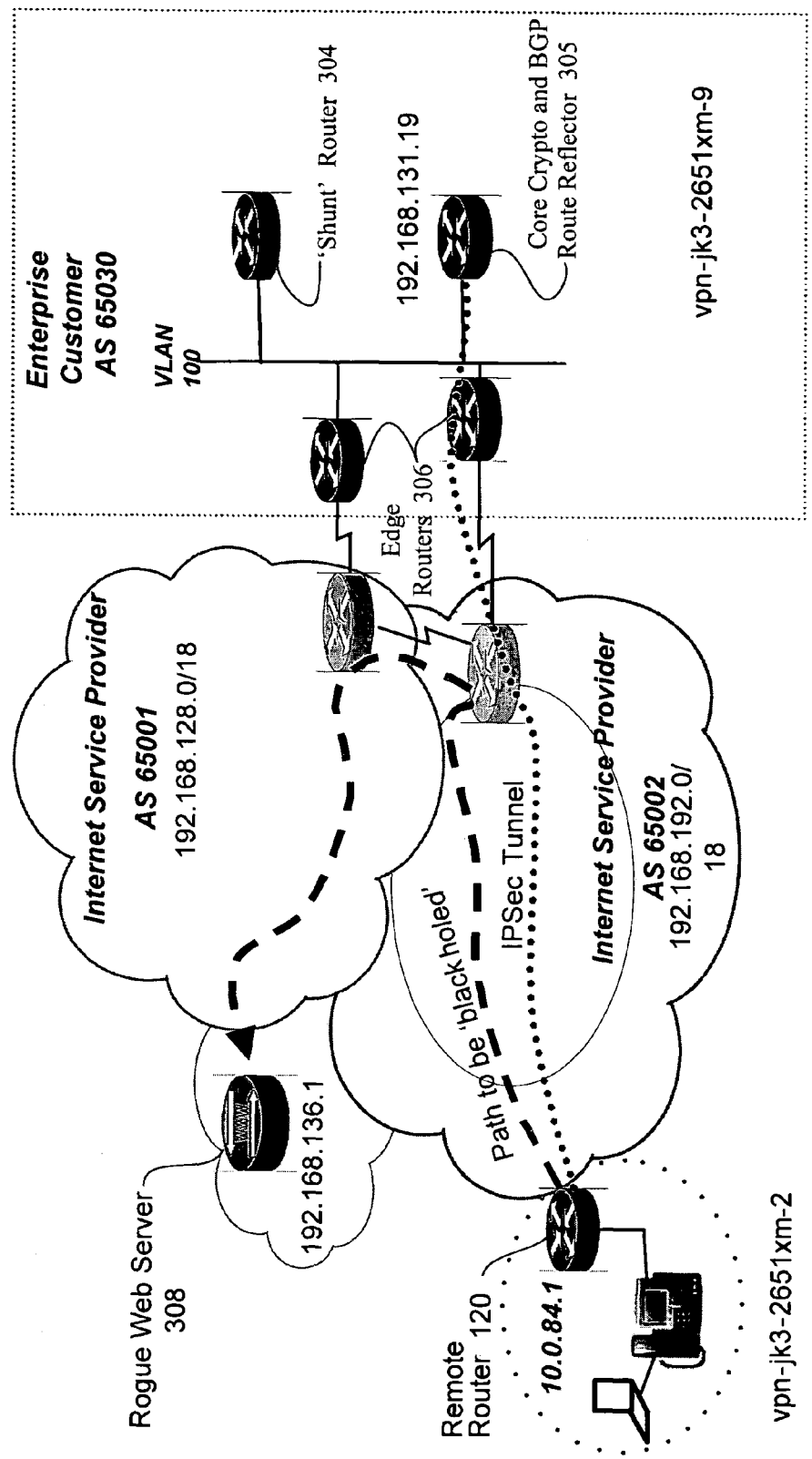
FIG. 3 illustrates another exemplary representative network topology in accordance with an embodiment of the present invention.

FIG. 3 is another representative communication network environment 300 in accordance with the present invention where three different autonomous systems (AS) are shown illustrated. AS 65030 is an enterprise customer, which may comprise a server farm or other campus networking infrastructure. Autonomous system edge routers 302 and 303 are iBGp peers with BGP 'shunt' router 304 and core crypto and BGP router reflector 305. When using dynamic crypto maps on the head-end routers and digital certificates/PKI, the only configuration change that is required on BGP 'shunt' router is to add a neighbor statement reference by the inside LAN interface IP address of the remote router. Specifically:

```
router bgp 65333
neighbor 10.0.94.1 peer-group REMOTE
end
```

When outgoing traffic is destined for the Internet, the global routing table of router 120 is consulted for both encrypted and non-encrypted (NAT/pNAT split tunnel) packets. This traffic is sent to a null route on each router 120 that presents no connectivity loss during normal operations. The presence of the 'ip route 192.0.2.0 255.255.255.0 Null 0' does not affect connectivity. Thus, no traffic is ever routed to this network because the network number is not a routable IP address on the Internet. It will be recognized that network 192.0.2.0/24 is usually reserved for documentation purposes.

Each remote router 120 that connects to an ISP is configured with a line or a tunnel to every other ISP-facing router. In an IPSec encapsulation network, typically it is hub and spoke configuration. Thus, for any router 120 in the network, packets that are to be encrypted are sent from a spoke to the hub to a destination spoke thru the respective tunnels. Packets that are not encrypted can reach hosts on the Internet directly. The ISP facing router is configured to first inspect the source address of a packet destined to an ISP and shunt it into the appropriate tunnel, ISP interface or blackholed. More specifically, router 120 examines the destination IP address and selects one of three possible outcomes. If the packet matches the crypto map access control list, it is encrypted and sent through the tunnel to the enterprise. If it is not a candidate for encryption, it will either be sent to the Internet proper, or blackholed if the address matches a rogue server IP address previously propagated via iBGP.

When fake or phishing e-mails from fraudulent aliases are detected, the destination of the phishing information is added to a list of blackholed websites addresses by the enterprise administrator to keep the users at remote offices 102 from accessing the website until the host webserver is taken offline by the hosting ISP 134. Rather than sending data packets to center 104, the blackholed list is sent to each remote router 120 to blackhole traffic destined for the fraudulent alias website.

When an email is sent to e-mail addresses within an enterprise customer e-mail domain that lists the rogue web server 308, which is located by way of example at 192.168.136.1, the destination of the phishing e-mail is added to a list of blackholed website addresses. This list keeps enterprise employees from accessing the website. The BGP router 304 is configured as the shunt router and it advertises the list of blackholed website addresses to the campus edge routers 306 and also to the BGP route reflector router 305 that peers with the remote office router 120. More specifically, route reflector router 305 advertises the blackholed address list to router 120 with a next hop of 192.0.2.1. At the remote office 102, remote router 120 has an IP route for 192.0.2.0/24 to Null0. This IP route will discard any packets to that destination address because all packets on remote router 120 use the global routing table. Thus, access to the rogue web server address is blocked for packets that do not traverse the IPSec tunnel to the campus head-end location.

Figure 4:
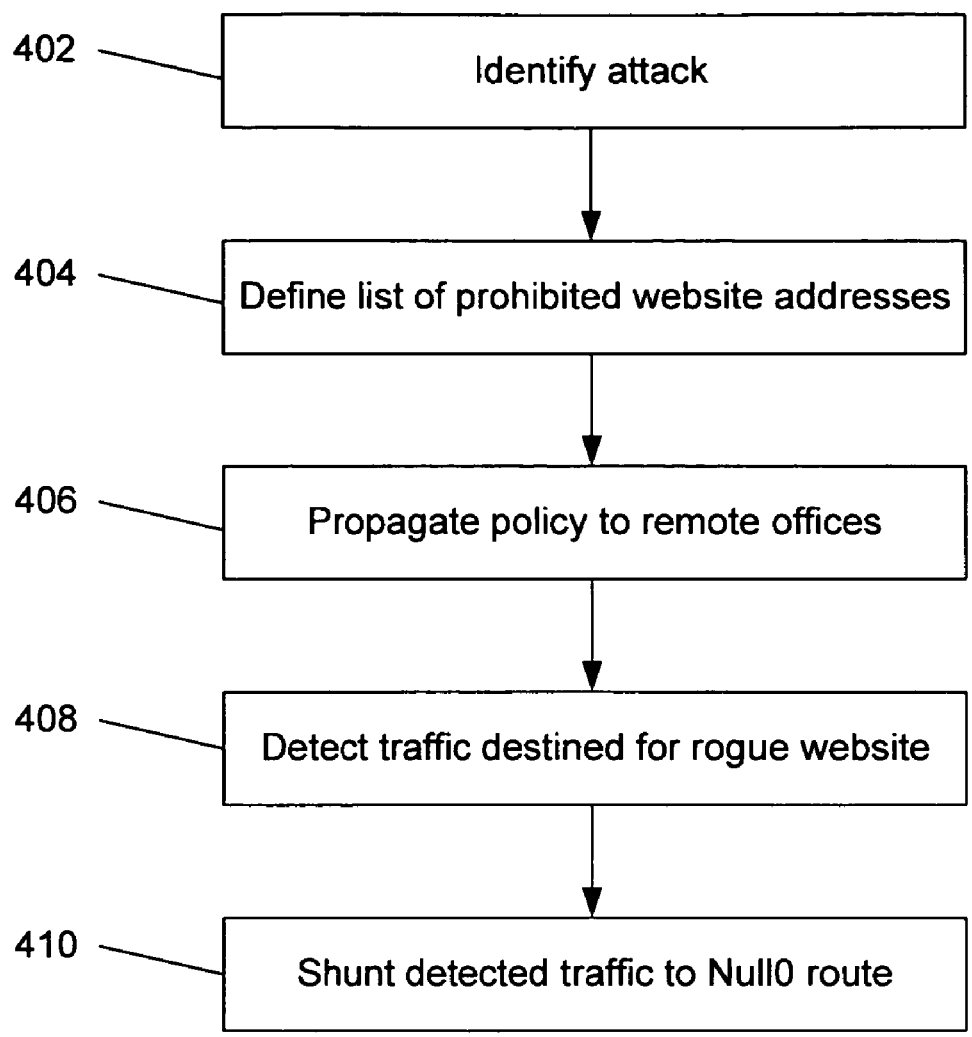
FIG. 4 illustrates a method for implementing an embodiment of the present invention.

FIG. 4 illustrates a method for implementing an embodiment of the present invention when email phishing or a rogue host problem is identified. When an attack is identified, as indicated at 402, the destination address is added to a list of blackholed websites addresses. Using the list, a central policy is defined that identifies prohibited websites or hosts as indicated at 404. As indicated at 406, a central policy configuration that includes the list of "blackholed" Website addresses is then dynamically propagated from the campus head-end to each remote router in a split tunnel configuration. In a preferred embodiment, iBGP is deployed to distribute the central policy configuration and the list of rogue host routes to prevent access thereto. This technique effectively pushes the central policy to distributed egress points from the enterprise network rather than moving the packet traffic from the remote office to a central policy and egress point at the head end. The policy configuration sets the next-hop to, for example, 192.0.2.1 for the listed website addresses and pushes that down to the remote routers as well. Outbound traffic that is destined for a rogue website on the list is detected at step 408 and shunted to the null route as indicated at 410. Latency and network loading is improved because return traffic is never sent out from the router and the rogue host cannot be contacted from the remote office.

An abbreviated remote router configuration in accordance with one embodiment of the present invention is illustrated as follows:

```
!
hostname vpn-jk3-2651xm-2
!
crypto map BRANCH_STATIC_IP 10 ipsec-isakmp
  description Branch with Static IP address
  set peer 192.168.131.19
  set transform-set 3DES_SHA_TUNNEL
  match address CRYPTO_ACL
!
! The outside IP address in this example is shown as a static address,
! however a dynamically assigned IP address could also be used
! as the BGP peering is sourced from the inside IP address
!
interface FastEthernet0/1
  description Outside
  ip address 192.168.192.22 255.255.255.0
  ip nat outside
  crypto map BRANCH_STATIC_IP
```

-continued

```
!
interface Ethernet1/0
  description Inside
  ip address 10.0.84.1 255.255.255.0
  ip nat inside
!
router bgp 65333
  no synchronization
  bgp log-neighbor-changes
  neighbor 192.168.131.19 remote-as 65333
!
! The BGP peering is sourced from the Inside IP address
!
  neighbor 192.168.131.19 update-source Ethernet1/0
  no auto-summary
!
! The Test Net is a RFC 3330 Special-Use IPv4 Addresses not routed
! on the Internet
!
ip route 192.0.2.0 255.255.255.0 Null0 name TEST_NET
!
! The default route could also be learned via DHCP or to a dialer
interface for PPPoE
!
ip route 0.0.0.0 0.0.0.0 192.168.192.2 240
!
ip nat inside source list NAT_THIS interface FastEthernet0/1 overload
!
ip access-list extended CRYPTO_ACL
!
! For illustration, 10.0.0.0 and 192.168.131.0 are the campus
head-end address space
!
  permit ip 10.0.84.0 0.0.0.255 10.0.0.0 0.255.255.255
  permit ip 10.0.84.0 0.0.0.255 192.168.131.0 0.0.0.255
ip access-list extended NAT_THIS
  deny ip 10.0.84.0 0.0.0.255 10.0.0.0 0.255.255.255
  deny ip 10.0.84.0 0.0.0.255 192.168.131.0 0.0.0.255
  permit ip 10.0.84.0 0.0.0.255 any
!
end
```

The global routing table of router 120 is consulted for both encrypted and non-encrypted (NAT/pNAT) split tunnel) packets. Every router 120 is configured with a static route for network 192.0.2.0/24 to the Null 0 (bit bucket) interface.

The route reflector iBGP router advertised to each router 120 the network address of any 'blackholed' websites with a next-hop of 192.0.2.1. These packets therefore follow the route 192.0.2.0/24 to the Null 0 interface. All other packets follow the default route to the Internet proper or are encrypted and sent through the IPSec tunnel.

An abbreviated remote router configuration for the core crypto and BGP 'shunt' routers 304 and 305 are illustrated as follows:

```
!
hostname vpn-jk3-2651xm-9
!
crypto dynamic-map DYNO-TEMPLATE 10
  description dynamic crypto map
  set transform-set 3DES_SHA_TRANSPORT 3DES_SHA_TUNNEL
  reverse-route
!
! The remote routers can use either static or dynamically assigned IP address as a
! dynamic crypto map is in use.
!
crypto map DYNO-MAP local-address FastEthernet0/1.100
crypto map DYNO-MAP 10 ipsec-isakmp dynamic DYNO-TEMPLATE
!
```

```
-continued

! A private AS number is used.
!
interface FastEthernet0/1.100
  description Outside interface
  encapsulation dot1Q 100
  ip address 192.168.131.19 255.255.255.224
  crypto map DYNO-MAP
!
router bgp 65333
  no synchronization
  bgp router-id 192.168.131.19
  bgp log-neighbor-changes
  redistribute static route-map static-to-bgp
  neighbor REMOTE peer-group
  neighbor REMOTE remote-as 65333
  neighbor REMOTE update-source FastEthernet0/1.100
  neighbor REMOTE route-reflector-client
!
! iBGP neighbors are referenced by the inside LAN. No need for a full iBGP mesh as !
route-reflector is configured.
!
  neighbor 10.0.84.1 peer-group REMOTE
!
! iBGP neighbor statements can be added when the IP addressing scheme is finalized
! but before the remote routers are actually deployed.
!
... [one neighbor statement for each remote router]
no auto-summary
!
!
ip route 192.0.2.0 255.255.255.0 Null0 name TEST_NET
!
! The offending rogue web server is referenced as a single IP route on the shunt
! router.
!
ip route 192.168.136.1 255.255.255.255 Null0 tag 666
!
! Note that this configuration is also available at ISP Security - Real World !Techniques
!
route-map static-to-bgp permit 10
  match tag 666
  set ip next-hop 192.0.2.1
  set local-preference 500
  set origin igp
  set community no-export
!
end
```

The following code illustrates a TCP session that is established from the remote router to the rogue web server. As that session is active, the VPN-jk3 route is entered on the head-end BGP shunt router 304. The TCP session 'hangs' as the IP address of the rogue web server, which is now routed to the Null 0 interface of the remote router.

```
vpn-jk3-2651xm-2#debug ip routing
IP routing debugging is on
vpn-jk3-2651xm-2#telnet 192.168.136.1 chargen /source e1/0
Trying 192.168.136.1, 19 ... Open
!"#$%&'( )*+,-
./0123456789:;<=>?@ABCDEFGHIJKLMNOPQRSTUVWXYZ[\]^_'abcdefg
... [removed] ...
@ABCDEFGHIJKLMNOPQRSTUVWXYZ[\]^_'abcdefghijklmnopqrstuvwxyz{|}~
!"#$%&'(
ABCDEFGHIJKLMNOPQRSTUVWXYZ[\]^_'abcdefghijklmnopqrstuvwxyz{|}~
!"#$%&'( )
Jun 14 16:54:54 edt: RT: SET_LAST_RDB for 192.168.136.1/32
    NEW rdb: via 192.0.2.1
Jun 14 16:54:54 edt: RT: add 192.168.136.1/32 via 192.0.2.1, bgp metric [200/0]
Jun 14 16:54:54 edt: RT: NET-RED 192.168.136.1/32
Jun 14 16:54:54 edt: RT: NET-RED queued, Queue size 1
vpn-jk3-2651xm-2#show ip route bgp
    192.168.136.0/32 is subnetted, 1 subnets
B   192.168.136.1 [200/0] via 192.0.2.1, 00:04:29
vpn-jk3-2651xm-2#sh ip route static | inc Null
S   192.0.2.0/24 is directly connected, Null0
```

-continued

```
vpn-jk3-2651xm-2#sh ip nat tran tcp
  Pro Inside global    Inside local    Outside local    Outside global
  tcp 192.168.192.22:11142 10.0.84.1:11142 192.168.136.1:19 192.168.136.1:19
```

In various embodiments of the present invention, a networking environment is provided with networking infrastructure and end-user's routing equipment that automatically blackholes traffic to rogue websites. The remote router may be owned and controlled by and the method to blackhole rogue websites performed by service providers. In other embodiments, the present invention is deployed with a remote gateway that implements a suitable routing protocol to blackhole the rogue websites.

Accordingly, the present invention provides remote routers, which utilize the iBGP protocol to configure routers, to block the return path to malicious websites with the use of split tunneling. The present invention allows enterprise policies for blocking access to "blackholed" website addresses to be centrally administered without requiring third party website traffic to be routed to the enterprise's network resources thereby minimizing latency. Remote offices may connect directly to third party websites but return traffic is not allowed. The present invention is simple to implement at remote routers deployed at each home or office location. The present invention decentralizes security response to respond to phishing attacks and is simple to implement in network infrastructure devices so that enterprises can protect their networks from phishing attacks.

Embodiments of the present invention enable enterprise IPSec deployments to dynamically propagate from the campus head-end to each remote router a list of "blackholed" rogue website addresses in a split tunnel configuration and prevent access from remote sites. This technique effectively pushes the central policy to distributed egress points from the enterprise network rather than moving the packet from a remote router to the central policy and egress.

Although the invention has been described with respect to specific embodiments thereof, these embodiments are merely illustrative, and not restrictive of the invention. For example, the network may include components such as routers, switches, servers and other components that are common in such networks. Further, these components may comprise software algorithms that implement connectivity functions between the network device and other devices.

The executable code described herein may be implemented in any suitable programming language to implement the routines of the present invention including C, C++, Java, assembly language, etc. Different programming techniques can be employed such as procedural or object oriented. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain and store the program for use by or in connection with the instruction execution system, apparatus, system or device. The memory can be, by way of example only but not by limitation, an electronic, magnetic, optical, a semiconductor system, apparatus, system, device, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for managing a network having a remote router coupled to a head-end location, the method comprising:
    identifying a rogue website via a shunt router coupled to said remote router by a split IPSec tunnel;
    advertising an address of said rogue website to said remote router to set up a centrally administered policy at said remote router, said head-end location being an enterprise head-end; and
    blocking traffic from said rogue website at said remote router by routing packet traffic destined for said rogue website to a black hole shunt at said remote router, said remote router having a Null0 IP route to blackhole traffic destined for said address of said rogue website identified by said shunt router.

2. The method of claim 1, wherein said remote router is coupled to a rogue web server that provides said rogue website using an Internet service provider (ISP).

3. The method of claim 1, further comprising blocking incoming traffic from said rogue website at a firewall.

4. The method of claim 1, further comprising configuring said shunt router to advertise said address of said rogue website to said remote router.

5. The method of claim 1, further comprising configuring a route reflector internal border gateway protocol (iBGP) router to push said address of said rogue website to said remote router.

6. The method of claim 1, wherein said routing packet traffic destined to said rogue website to said Null0 IP route comprises ip route 192.0.2.0 255.255.255.0 Null0 name TEST_NET.

7. The method of claim 1, wherein said remote router has a static IP address.

8. The method of claim 1, wherein said remote router has a dynamic IP address.

9. The method of claim 1, further comprising defining a central policy that identifies websites associated with an email phishing scheme.

10. The method of claim 1, further comprising configuring a route reflector internal border gateway protocol (iBGP) router to advertise said address of said rogue website to at least one peer remote router so that traffic destined to said rogue website is blackholed.

11. A network topology, comprising:
    an enterprise head-end having a shunt router, said shunt router being configured to identify a rogue website;
    a remote router coupled to said shunt router by a split IPSec tunnel, said remote router having a Null0 IP route to blackhole traffic destined for a rogue address of said rogue website identified by said shunt router; and
    a route reflector coupled to said shunt router, said route reflector being configured to advertise said blackholed traffic destined for said rogue addresses to said remote router.

12. The network topology of claim 11, wherein said route reflector comprises an internal border gateway protocol (iBGP) router.

13. The network topology of claim 11, wherein said route reflector and said remote router are border gateway protocol (BGP) peers.

14. The network topology of claim 11, wherein said route reflector and said remote router are coupled by said split IPSec tunnel.

15. The network topology of claim 11, wherein traffic between said enterprise head-end and said remote router is sent on said split IPSec tunnel.

16. The network topology of claim 11, wherein said Null0 IP route comprises ip route 192.0.2.0 255.255.255.0 Null0 name TEST_NET.

17. The network topology of claim 11, further comprising means for defining a central policy to block access to websites associated with an email phishing scheme.

18. A network topology, comprising:
    an enterprise head-end having a shunt router, said shunt router being configured to identify a rogue website;
    a remote router coupled to said shunt router in said enterprise head-end by a split IPSec tunnel, said remote router having a Null0 IP route to blackhole traffic destined for a rogue address of said rogue website identified by said shunt router; and
    means for generating a list of blackholed website addresses, and for advertising said list to peer routers of said remote router.

19. In a network system having a remote router coupled to a peer shunt router by an IPSec split tunnel, a method for blocking access to a malicious website, the method comprising:
    receiving, at said remote router, a central policy that specifies that access to said malicious website is denied for outgoing traffic, said malicious website being identified by said peer shunt router;
    sending traffic destined for said malicious website to a black hole shunt at said remote router, said remote router having a Null0 IP route to blackhole traffic destined for said malicious website; and
    blocking incoming traffic from said malicious website.

20. The method of claim 19, further comprising:
    advertising said central policy to said remote router using internal border gateway protocol (iBGP).

21. The method of claim 20, wherein said black hole shunt comprises a route having an address of:
   ip route 192.0.2.0 255.255.255.0 Null0 name TEST_NET.

22. The method of claim 21, further comprising:
   establishing a transmission control protocol (TCP) session from said remote router to said malicious website;
   propagating said central policy to said shunt router, said central policy comprising a list of blackholed websites; and
   entering said route to said malicious website at said shunt router.

* * * * *